United States Patent Office.

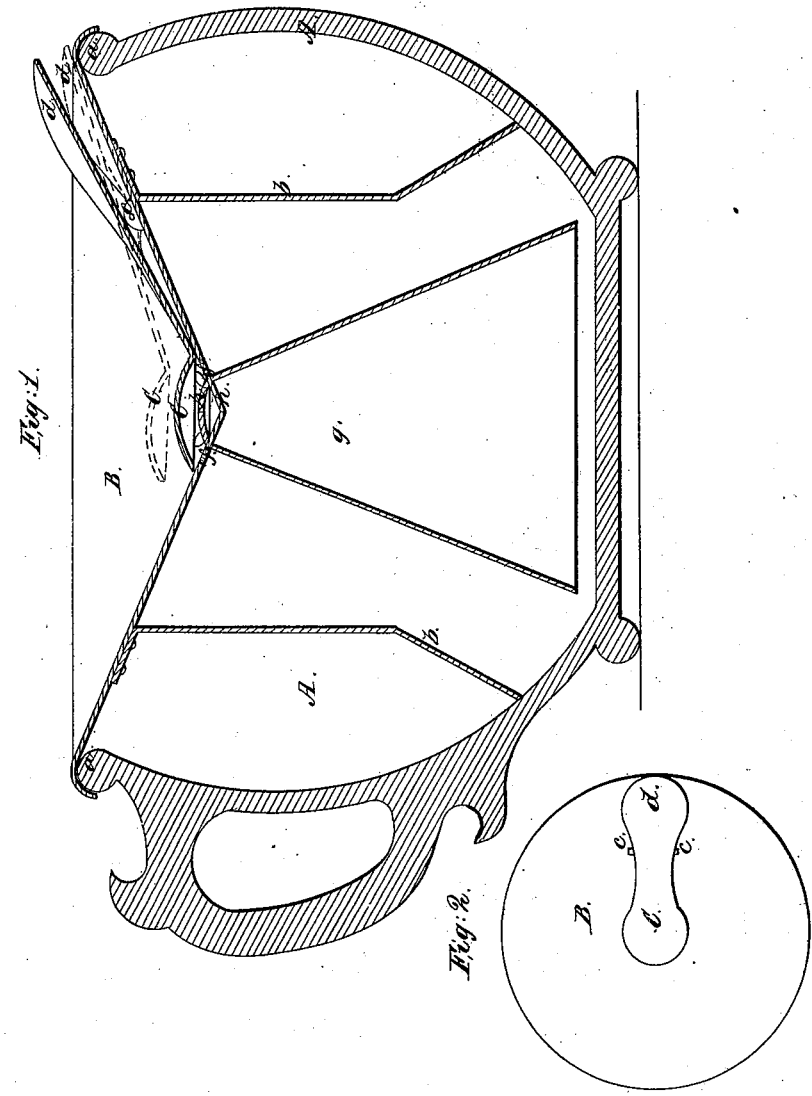

CHARLES ROBINSON, OF BOSTON, MASSACHUSETTS.

Letters Patent No. 76,817, dated April 14, 1868.

IMPROVED CHAMBER-VESSEL.

*The Schedule referred to in these Letters Patent and making part of the same.*

TO ALL WHOM IT MAY CONCERN:

Be it known that I, CHARLES ROBINSON, of Boston, in the county of Suffolk, and State of Massachusetts, have invented an Improved Chamber-Vessel; and I do hereby declare that the following is a full and exact description thereof, reference being had to the accompanying drawings, making part of this specification—

Figure 1 being a vertical central section of a chamber-vessel provided with my improvement.

Figure 2, a top view (on a smaller scale) of the valve-cover, in which my invention consists.

Like letters designate corresponding parts in both figures.

My improvement consists in the employment of a hollow or concave cover, which receives the water, and conducts it into the vessel noiselessly, and is provided with a valve, that is opened in the act of sitting upon the vessel, and again closes as the vessel is risen from.

Let A, in the drawings, represent the vessel. B is a hollow or concave cover, fitting over the rim of the vessel, or inside thereof, if preferred, so as to be used in addition to the ordinary cover. The slope of the cover inward is such as to receive the water noiselessly, and at the centre or lowest part a hole, $f$, or, preferably, holes, $f\,f$, are made, through which the water is admitted through the cover into the vessel; and in order that no noise may be heard inside, a conical or other form of inclined or sloping conductor, $g$, is attached under the cover, and extends nearly down to the bottom of the vessel, so as to spread the water, and conduct it down noiselessly.

The apertures $f\,f$ are covered by a valve, C, which is pivoted or otherwise provided with a fulcrum at $c$, with an extension, $d$, upward, substantially as represented. This valve is so arranged that, on sitting down, the extension $d$ is depressed sufficiently to raise the valve, and allow the water to pass down into the vessel. Then, on setting the extension $d$ free, the valve descends, and closes the apertures $f\,f$.

In order that the conductor $g$ may fill on a level with the rest of the vessel, and not retain water as the cover is lifted, nor tend to float the cover, a vent-aperture, (or apertures,) $h$, is made in the top, to allow the air to pass.

Springs or guides $b\,b$, attached to the lower side of the cover B, and extending down into the vessel, may be used, but they are not essential.

What I claim as my invention, and desire to secure by Letters Patent, is—

The combination of the concave or inclined cover B, and valve C, with its extension, $d$, arranged and operating substantially as and for the purpose herein specified.

In combination with the cover B, I also claim the inclined conductor $g$ beneath, substantially as and for the purpose herein set forth.

The above specification signed by me, this second day of January, 1868.

CHARLES ROBINSON.

Witnesses:
C. P. JUDD,
JOSEPH CUTLER.